(12) United States Patent
Nakao et al.

(10) Patent No.: US 7,135,230 B2
(45) Date of Patent: Nov. 14, 2006

(54) FUNCTIONAL PARTICLE AND PREPARING/PLASMA-TREATING METHOD OF THE SAME

(75) Inventors: Shin-ichi Nakao, Bunkyo-ku (JP); Takeo Yamaguchi, Bunkyo-ku (JP); Liang-Yin Chu, Bunkyo-ku (JP); Sang-Hoon Park, Bunkyo-ku (JP)

(73) Assignee: Reika Kogyo Kabushiki Kaisha, Miyazaki (JP)

( * ) Notice: Subject to any disclaimer, the term of this patent is extended or adjusted under 35 U.S.C. 154(b) by 102 days.

(21) Appl. No.: 10/632,861

(22) Filed: Aug. 4, 2003

(65) Prior Publication Data

US 2004/0023029 A1 Feb. 5, 2004

Related U.S. Application Data

(63) Continuation of application No. PCT/JP02/01104, filed on Feb. 8, 2002.

(30) Foreign Application Priority Data

Feb. 9, 2001 (JP) .............................. 2001-033407

(51) Int. Cl.
*B32B 5/16* (2006.01)
(52) U.S. Cl. .................. 428/403; 428/407; 525/902
(58) Field of Classification Search ................ 428/403, 428/407; 427/569, 220, 221, 222; 424/490; 525/902
See application file for complete search history.

(56) References Cited

U.S. PATENT DOCUMENTS

| | | | | |
|---|---|---|---|---|
| 5,202,025 A | * | 4/1993 | Onishi et al. .......... | 210/500.35 |
| 5,306,505 A | * | 4/1994 | Kuzuya et al. ............. | 424/464 |
| 5,376,384 A | * | 12/1994 | Eichel et al. ............... | 424/480 |
| 5,476,665 A | * | 12/1995 | Dennison .................... | 424/484 |
| 5,804,263 A | * | 9/1998 | Goldberg et al. .......... | 428/34.7 |
| 6,203,850 B1 | * | 3/2001 | Nomura ...................... | 427/245 |
| 6,440,918 B1 | * | 8/2002 | France ........................ | 510/349 |
| 6,730,325 B1 | * | 5/2004 | Devane et al. ............. | 424/489 |
| 6,733,847 B1 | * | 5/2004 | Kunz et al. ................. | 427/533 |
| 6,932,983 B1 | * | 8/2005 | Straub et al. ............... | 424/489 |

FOREIGN PATENT DOCUMENTS

| | | |
|---|---|---|
| JP | A 61-89236 | 5/1986 |
| JP | A 3-98632 | 4/1991 |
| JP | A 4-334531 | 11/1992 |
| JP | A 5-31343 | 2/1993 |
| JP | A 5-237352 | 9/1993 |
| JP | A 5-246141 | 9/1994 |
| JP | A 11-130827 | 5/1999 |
| JP | A 2001-860 | 1/2001 |
| JP | A 2002-226531 | 8/2002 |

\* cited by examiner

*Primary Examiner*—H. Thi Le
(74) *Attorney, Agent, or Firm*—Oliff & Berridge, PLC

(57) ABSTRACT

At least one of a hollow particle 14, a porous particle 24, and a solid particle 34 having the pores 18, 28, 38 on the surface thereof is subjected to plasma irradiation under a reduced pressure while changing plasma irradiation intensity and/or the degree of vacuum. After the plasma irradiation, at least one type of monomer is graft polymerized onto the surface of the plasma irradiated particle by contact between the at least one type of monomer and the particle so as to substantially fill the pores 18, 28, and 38 of the particle with grafted polymers 12 of the monomers.

13 Claims, 9 Drawing Sheets

IN LOW-DENSITY GRAFT POLYMER

IN HIGH-DENSITY GRAFT POLYMER

FUNCTIONAL PARTICLE AND PREPARING/PLASMA-TREATING METHOD OF THE SAME

This is a Continuation of Application No. PCT/JP02/01104 filed Feb. 8, 2002. The entire disclosure of the prior application is hereby incorporated by reference herein in its entirety.

BACKGROUND OF THE INVENTION

1. Field of the Invention

The present invention relates to functional particles and a preparing method thereof, and more particularly relates to a functional particle preparing method in which plasma irradiation intensity and/or the degree of vacuum are changed during plasma irradiation according to the size of each gap between particles to form grafted polymers having uniform graft lengths on the particles, and relates to a functional particle prepared by the functional particle preparing method. Further, the present invention relates to a plasma treatment method in which particles are fixed in a stacked form to which plasma is irradiated for uniform plasma treatment over the entire particles.

2. Description of the Related Art

The inventor of the present application and others suggest a separation membrane formed by plasma graft polymerization carried out on a fine porous membrane so as to substantially fill pores of the fine porous membrane with plasma-grafted polymers and a method for preparing the separation membrane.

For example, in Japanese Patent Laid-Open Publication No. Hei 3-98632 entitled "Separation Membrane and Separation Method", a separation membrane formed by plasma-graft polymerizing acrylic monomers on a fine porous membrane made of polyethylene of ultrahigh molecular weight having predetermined porosity and predetermined average pores so as to substantially fill pores of the fine porous membrane with acrylic graft polymers is disclosed. In particular, this separation membrane lends itself to application such as a separation membrane for organic solvent mixtures which separates an organic solvent having high compatibility with acrylic polymers from an organic solvent having low compatibility with the acrylic polymers. Here, it should be noted that the "plasma-graft polymerization" refers to a way in which a fine porous membrane is irradiated by plasma in an environment at a predetermined degree of vacuum and then the plasma treated fine porous membrane is soaked in a monomer solution to graft polymerize the monomers.

Further, in Japanese Patent Laid-Open Publication No. Hei 4-334531 entitled "Separation membrane And Method", a separation membrane prepared by plasma-graft polymerization carried out on a polyethylene fine porous membrane using a plurality of different types of monomers which vary in solubility to substantially fill pores of the fine porous membrane with grafted polymers is disclosed. It is also described that by graft polymerizing a plurality of types of monomers, a mixture consisting of liquids which are of similar solubility can be appropriately separated.

Still further, in Japanese Patent Laid-Open Publication No. Hei 5-31343 entitled "Separation Membrane, Preparing and separation Method of The Same", a separation membrane prepared by plasma-graft polymerizing nonaqueous monomers on a polyethylene fine porous membrane to substantially fill pores of the fine porous membrane with grafted polymers is disclosed.

In Japanese Patent Laid-Open Publication No. Hei 5-237352 entitled "Separation Membrane And Separation", a separation membrane prepared by plasma-graft polymerizing acrylic monomers and cross-linked monomers on a polyethylene fine porous membrane to fill pores of the fine porous membrane with acrylic cross-linked graft polymers is disclosed.

Further, in Japanese Patent Laid-Open Publication No. Hei 6-246141 entitled "Separating Membrane, Its Production And Separating Method" a separation membrane prepared by plasma-graft polymerizing acrylate monomers represented by $CH_2=CHOOR$ (R is an alkyl group having 10 or greater carbon numbers) on a polyester fine porous membrane to substantially fill pores of the fine porous membrane with grafted polymers of acrylate monomers is disclosed. By using acrylate monomers as a monomer to be filled in the pores, the obtained separation membrane can selectively permeate organic compounds contained in water so as to be separated from the water.

All of the above-described separation membranes and preparing methods provide a separation membrane in which pores of a fine porous membrane are filled with plasma-grafted polymers and a method for preparing the separation membrane. The plasma-grafted polymers filling the pores selectively separate organic compounds in a solution in response to an environment of the solution around the separation membrane.

In the prior art, when a plurality of particles are subjected to plasma irradiation, in order to uniformly apply plasma irradiation on the surfaces of the particles, the particles are placed on a rotating table to which plasma is gradually irradiated.

Accordingly, the technical concept of carrying out one-time plasma irradiation on a large quantity of particles for subsequent graft polymerization of monomers was not suggested in the prior art.

In recent years, there has been a growing interest in drug delivery systems. In particular, refinements are actively introduced into the drug delivery systems to achieve drug delivery which is programmed with respect to the quantity of release or drug delivery which is programmed with respect to the time of release, or to provide an improved drug delivery system in which drugs are distributed to a specific area. In such a drug delivery system, it is to be desired that particles are used to include a drug and the right quantity of the drug is provided to an appropriate area from the particle in response to an environment around the particles.

SUMMARY OF THE INVENTION

The present invention, which was conceived in view of the aforesaid problems, is therefore directed to plasma-graft polymerize a large quantity of particles at a time to fill pores of the particles with grafted polymers, to control the manner of releasing inclusions in the particles by adjusting the extent to which the pores are filled with grafted polymers, and to provide functional particles in which pores of a plurality of the functional particles are uniformly filled with plasma-grafted polymers and a method of preparing the functional particles.

In order to solve the above problem, the functional particles, the functional particle preparing method, and a plasma treatment method according to the present invention have the following features.

(1) A functional particle preparing method comprises steps of treating either one of a hollow particle or a porous particle having a pore on the surface thereof by plasma irradiation under a reduced pressure; and graft polymerizing at least one type of monomer onto the surface of the plasma irradiated particle by contact between the at least one type of monomer and the surface of the plasma irradiated particle so as to substantially fill the pore of the particle with grafted polymers of the monomer. In the functional particle preparing method, during the plasma irradiation, plasma intensity and/or the degree of vacuum are controlled, and during the contact with the monomer for graft polymerization, at least one of the requirements for monomer concentration, graft polymerization temperature, and graft polymerization time is adjusted to control graft polymerization yield of the grafted polymers.

By adjusting the plasma intensity and/or the degree of vacuum, a depth in a particle to which the particle is excited by plasma can be controlled. Further, by adjusting the requirements when the plasma-treated particles are brought into contact with the monomers, graft polymerization yield of the monomers can be controlled. Here, it should be noted that "graft polymerization yield" includes graft length and graft density. According to such control, a particle containing desired grafted polymers could be obtained. For example, when a hollow particle is subjected to graft polymerization after plasma irradiation, by including drugs into the particles, it becomes possible to prepare a particle having a desired time-release feature relative to, for example, temperature or pH. As a first and second condition for this type of preparation, for example, temperature, pH, ion strength, solution concentration, potential, a wavelength of the potential, and a magnetic field may be established.

(2) A functional particle characterized by that graft polymerization yield of grafted polymers obtained from at least one type of monomer, the grafted polymers which substantially fill a pore of said particle, is controlled by adjusting a reduced pressure, plasma intensity and/or the degree of vacuum while treating either one of a hollow particle or a porous particle having a pore on the surface thereof by plasma irradiation, and adjusting at least one of requirements for monomer concentration, graft polymerization temperature, and graft polymerization time while graft polymerizing the at least one type of monomers onto the surface of the plasma irradiated particle by contact between the at least one type of monomers and the surface of the plasma irradiated particle.

Accordingly, a particle in which grafted polymers are grown at a desired depth can be prepared, which in turn makes it possible to provide time-release particles usable, for example, in the DDS as described above.

(3) In a functional particle preparing method according to description (1), a solution having an inclusion to be inserted into the particle is adjusted on a first condition that the grafted polymers substantially filling the pore of the functional particle are shrunk or hydrophilic; then the functional particle is soaked in the solution having an inclusion which is adjusted on the first condition; and then the solution having an inclusion is adjusted on a second condition that the grafted polymers of the functional particle are expanded or hydrophobic, and an inclusion-impregnated functional particle is separated from the solution having an inclusion.

By adjusting the solution to have a first temperature or a first pH at which openings are formed in the functional particle or penetration of inclusions from the outside is allowed, the inclusion is impregnated into the inside of the functional particle. On the other hand, by adjusting the solution to have a second temperature or a second pH at which openings of the functional particle are closed or penetration of inclusion from the outside is prevented, the inclusion having been impregnated into the functional particle is retained in the functional particle. Then, the inclusion-impregnated particle can be separated from the solution in a state where the inclusion is kept in the particle. Accordingly, it is possible to prepare, for example, a medicament-impregnated particle for the DDS capable of releasing impregnated medicaments in response to the condition of, for example, temperature or pH.

(4) In a functional particle according to description (2), the functional particle is an inclusion-impregnated particle in which the pore and/or a cavity region in the functional particle are impregnated with an inclusion.

By adjusting the temperature or pH as described above, the status of the grafted polymers can be changed, to thereby retain or release the inclusion.

(5) The present invention further provides a plasma treatment method for uniformly treating all particles by plasma treatment wherein at least one of solid particles, hollow particles, and porous particles, each having a pore on the surface thereof, are fixed in a stacked form to which plasma is irradiated under a reduced pressure while adjusting plasma irradiation intensity and/or the degree of vacuum according to the size of each gap between particles.

In general, when a subject is plasma irradiated, the subject is placed in an atmosphere of inert and other gases. The present inventors discovered that attack by electrons due to plasma excites the inert and other gases, which in turn excite the surface of the subject. Further, they found that the excited gas generates vacuum ultraviolet rays capable of exciting the inside of the subject by penetrating into the inside to an extent in the order of nanometers from the surface of the subject as well as irradiating the surface of the subject.

Accordingly, by changing plasma irradiation intensity and/or the degree of vacuum in accordance with the size of each gap between particles, the extent to which the inert and other gases around the particles are excited during plasma irradiation can be adjusted. Such adjustability enables, even in a case where a plurality of particles are stacked on top of each other and fixed in the stacked form, vacuum ultraviolet rays generated by the excited gases to excite the pore surface of each of the particles including those placed at a deeper portion of the stacked form.

Because it has been considered that plasma treatment is exerted only on the surface in the prior art, plasma irradiation is usually carried out in a state where subject particles are flowing.

However, in plasma treatment according to the present invention, even when a plurality of particles are treated by plasma irradiation at a time in a state where they are fixed, each surface of the particles and each inner surface of the pores can be excited sufficiently (radicals can be generated). The sufficient excitation enables adequate graft polymerization of the monomers which are to be brought into contact with the particles after the plasma irradiation, as described later. Thus, a large amount of particles whose pores are filled with desired grafted polymers can be obtained by one-time plasma-graft polymerization.

(6) The present invention further provides a functional particle preparing method comprising steps of fixing at least one of solid particles, hollow particles, and porous particles, each having a pore on the surface thereof, in a stacked form, to which plasma is irradiated under a reduced pressure while adjusting plasma irradiation intensity and/or the degree of vacuum according to the size of each gap between particles so as to treat all the particles by plasma irradiation; and graft polymerizing at least one type of monomer on the plasma irradiated particles by contact between the at least one type of monomer and the particles so as to substantially fill the pores of said particles with grafted polymers of said monomer.

As described above, all particles can be plasma treated by one-time plasma irradiation in a state where a plurality of particles are fixed in a stacked form, and the plasma treated particles can easily be subjected to graft polymerization.

(7) In a functional particle preparing method according to description (1) or (6), the plasma-irradiated particle is soaked in a monomer solution or brought into contact with a monomer gas.

(8) In the functional particle according to description (2), the plasma-irradiated particle is soaked in a monomer solution or brought into contact with a monomer gas.

By plasma irradiation and irradiation of vacuum ultraviolet rays generated from the excited gas, not only the surfaces of the particle but also the inner surfaces of the pores can be excited. When the particle having the excited surfaces is soaked in the monomer solution or brought into contact with monomers in gas phase, radicals generated on the excited surfaces causes graft polymerization to progress so that the grafted polymers cover the particle surface as well as filling pores of the particles. By generating grafted polymers of normal chains instead of cross-linking, a drug deliver particle capable of quickly responding to a change in environment can be prepared.

(9) In a functional particle preparing method according to description (6), the plasma irradiated particles are brought into contact with a cross-linking agent simultaneously with or subsequently to the contact with the monomers.

By cross-linking the grafted polymers, the extent to which inclusions in the particle are released can be controlled depending on the degree of cross-linking.

(10) In a functional particle preparing method according to description (1) or (6), the particle consists of at least one of an organic macromolecule and an inorganic macromolecule.

It is preferable to select materials constituting a particle from organic and inorganic macromolecules with reference to the uses of the particle. Considering retaining of inclusions, a particle having a low degree of solubility in a solution is more preferable.

(11) In a plasma treatment method according to description (5), the size of each gap between particles is equal to or greater than 0.01 μm.

(12) In a functional particle preparing method according to description (1) or (6), the size of each gap between particles is equal to or greater than 0.01 μm.

Because 0.01 μm is the minimum size of the gap between particles with which plasma treatment can be applied on the particles including those in a lower portion of stacked particles by controlling plasma intensity and/or the degree of vacuum even when a plurality of particles are fixed in the stacked form, the surfaces of a large amount of particles and the inner surfaces of the pores in the particles can be adequately excited as long as the size of the gap between particles is equal to or larger than 0.01 μm. Accordingly, ultra-fine particles movable in capillaries can be plasma treated in a state where the ultra-fine particles are fixed in a stacked form, and monomers are graft polymerized in a downstream process.

(13) In still another aspect, the present invention provides functional particles prepared by the functional particle preparing method according to any one of the above descriptions (6), (7), (10), and (12).

(14) In the functional particle according to description (13), the grafted polymers fill the pore at high density.

(15) In the functional particle according to description (13), the grafted polymers fill the pore at low density.

(16) In the functional particles prepared by the functional particle preparing method according to description (1), the grafted polymers of the functional particles fill the pores at high density.

(17) In the functional particles prepared by the functional particle preparing method according to description (1), the grafted polymers of the functional particles fill the pores at low density.

Depending on the extent to which a pore is filled with grafted polymers, aperture size of the pore varies in response to changes in the surrounding environment. For example, as will be described later, at low density, when the temperature around the particle is higher than the lower critical solution temperature (hereinafter referred to as "LCST"), the aperture size increases due to shrinkage of the grafted polymers, whereas when the temperature is lower than the LCST, the aperture size decreases due to expansion of the grafted polymers. On the other hand, at high density, when the temperature is lower than the LCST, the grafted polymers in the pores turn into hydrophilic states, whereas when the temperature is higher than the LCST, the grafted polymers in the pores turn into hydrophobic states due to the pores being crammed with the grafted polymers. Accordingly, in either situation, by changing the temperature around the particles, releasing and holding of inclusions in the particle can be controlled.

The term "critical solution temperature" is generally understod to mean the temperature above which an immiscible-liquid system no longer separates into two liquid phases. Some liquid system is totally miscible. In systems that include a polymer component and a liquid solute phase, "lower critical solution temperature" is a term of art relating to a temperature at which the behavior of the polymer system is changed. In such systems, the polymer solution undergoes reversible and repeatable changes in response to wheather the temperature is above or below the lower critical solution temperature of the system. For example, the polymer may change from a hydrophobic to a hyrdrophilic state, as in the high density grafted polymers of embodiments, or the polymer may shrink and/or swell in response, as in the low density grafted polymers of embodiments.

PREFERRED EMBODIMENT OF THE INVENTION

Figure 1:
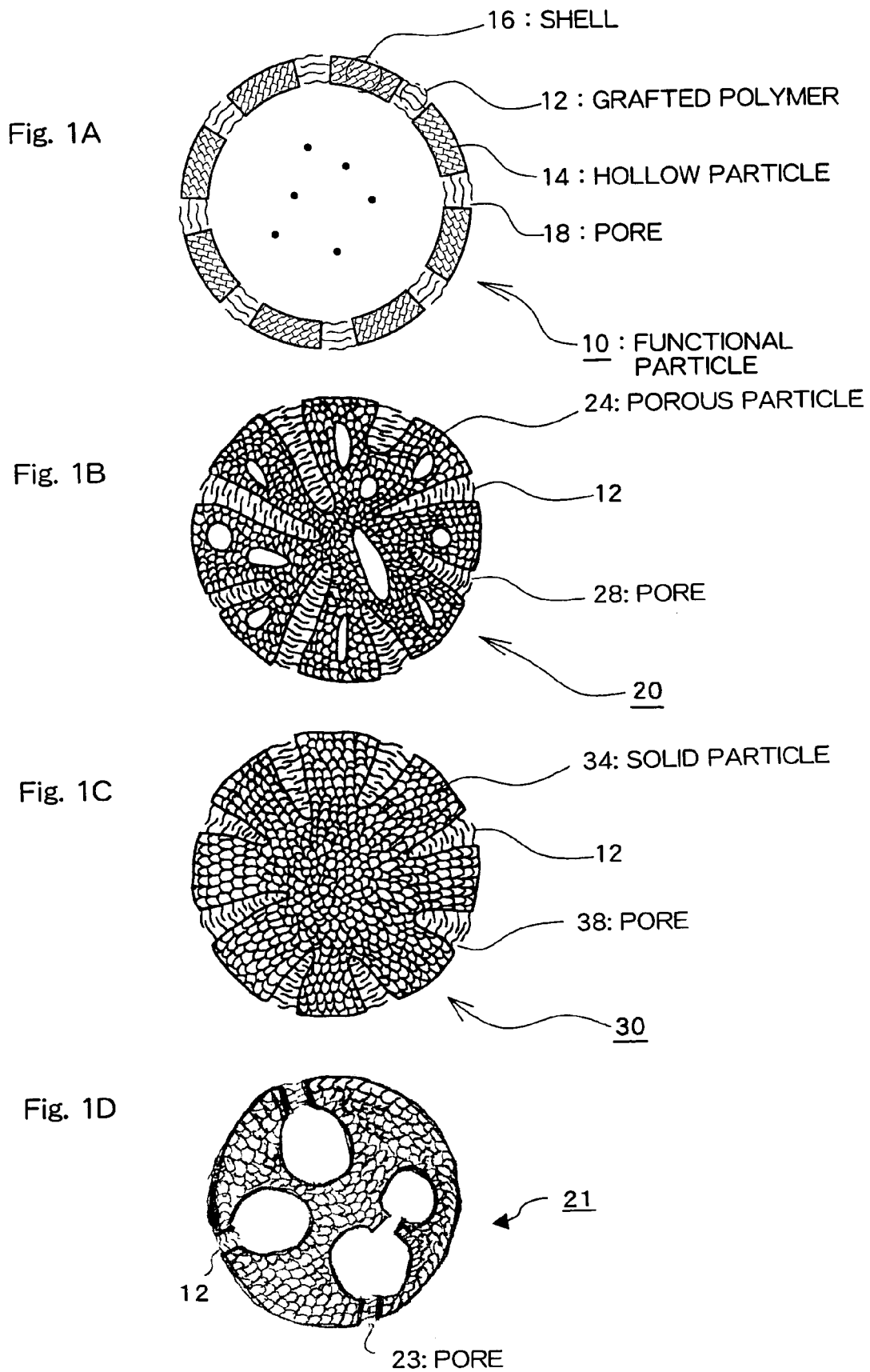
FIGS. 1A, 1B, 1C, and 1D are sectional views of functional particles in which pores according to the present invention are substantially filled with grafted polymers.

Preferred embodiments of the present invention will be described below.

Embodiment 1

In a functional particle preparing method according to a first embodiment of this invention, comprising steps of treating either one of a hollow particle or a porous particle having a pore on the surface thereof by plasma irradiation under a reduced pressure, and graft polymerizing at least one type of monomer onto the surface of the plasma irradiated particle by contact with the at least one type of monomer and the surface of the plasma irradiated particle so as to substantially fill the pore of the particle with the grafted polymers of the monomer, (i) during the plasma irradiation, plasma intensity and/or the degree of vacuum is controlled, and (ii) during the contact with the monomer for graft polymerization, at least one requirement of monomer concentration, graft polymerization temperature, and graft polymerization time is adjusted to control graft polymerization yield of the grafted polymers.

A particle used in this embodiment may preferably be at least one of a hollow particle 14, a porous particle 24, and a solid particle 34, each at least having a pore on the surface thereof as shown in FIGS. 1A to 1D. It should be noted that a microcapsule, for example, is counted as the hollow particle, and the solid particle refers to a particle having a solid core.

The above particle of this embodiment consists of an organic macromolecular compound or an inorganic macromolecular compound. As a preferable macromolecular compound, an organic macromolecular compound whose coupling can easily be cleaved using plasma, such as —CH or —CF, may be adopted, and it is more preferable that the organic macromolecular compound is nonaqueous and of ultrahigh molecular weight. Regarding the molecular weight, it is desirable that weight-average molecular weight, for example, is equal to or greater than $5 \times 10^5$, or more preferably, between $1 \times 10^6$ and $1 \times 10^7$. Composition of the organic macromolecular compound may be selected from, for example, synthesized macromolecular compounds, such as nylon, polyester, polyolefin, and polystyrene, and natural macromolecular compounds, such as chitosan, cellulose, and alginic acid. As the inorganic macromolecular compound, alumina, zirconia, silica, or the like may be utilized.

The diameter of the particle may preferably be 0.1–100 μm. The average pore diameter of the pore provided on the surface of the particle may preferably be 0.005–1 μm, and porosity on the surface may be 30–95%, or more preferably, may lie in the range of 35–90%.

It should be noted that, if necessary, an antioxidant, a slip additive, an antiblock additive, a pigment, a dye, and various types of fillers and additives may be included in the particle of this embodiment within a range which does not constitute departure from the spirit and scope of the present invention.

The particle made of the organic macromolecular compound may be prepared by, for example, suspension polymerization or emulsion polymerization.

A functional particle according to this embodiment will be described below. In the functional particle of this embodiment, a pore reaching to the particle surface is substantially filled with grafted polymers (described later) as shown in FIGS. 1A, 1B, 1C, and 1D.

More specifically, in a functional particle 10 shown in FIG. 1A, pores 18 formed on a shell 16 of a hollow particle (microcapsule) 14 are substantially filled with grafted polymers. In a functional particle 20 shown in FIG. 1B, pores 28 reaching to the surface of a porous particle 24 are substantially filled with grafted polymers. Further, in a functional particle 30 shown in FIG. 1C, pores 38 reaching to the surface of a solid particle 34 are substantially filled with grafted polymers. A particle 21 shown in FIG. 1D has a plurality of cavities in the inside of the particle 21, and pores 23 connected to the cavities are substantially filled with grafted polymers. Although grafted polymers formed on the particle surface are not shown in FIGS. 1A to 1D, the grafted polymers are, in reality, formed on the particle surface as well.

The grafted polymers may be obtained by plasma graft polymerization (described later) of a monomer. As a monomer used for the plasma graft polymerization, for example, acrylic acid, methyl acrylate, glycidyl acrylate, ethyl acrylate, butyl acrylate, 2-ethylhexyl acrylate, benzyl acrylate, methyl methacrylate, butyl methacrylate, 2-ethylhexyl methacrylate, 2-dimethylaminoethyl metacrylate, 2-diethylaminoethyl metacrylate, 2-dimethylaminoethyl acrylate, 2-diethylaminoethyl acrylate, 2-vinylpyridine, styrene, α-methyl styrene, acrylonitrile, acrylamide, N-isopropyl acrylamide (NIPAM), allylamine, an allyl alcohol, diallylamine, diallyl maleate, allyl glycidyl ether, vinyl acetate, N-vinyl-2-pyrrolidone, ethyl vinyl ether, methyl vinyl ketone, divinylbenzene, 2-hydroxyethyl acrylate, ethylene glycol dimethacrylate, 2-hydroxyethyl methacrylate, 2-hydroxypropyl methacrylate, a maleic anhydride, or the like may be used.

Monomers used for the graft polymerization consist of at least one type of monomer. Random copolymerization or graft polymerization for generating block copolymers may be carried out by combining a plurality of types of monomers.

Further, a cross-linked monomer may be added to the above-described monomers simultaneously with or subsequently to the graft polymerization. As an above cross-linked monomer, a monomer having two or more double bonds in a molecule and capable of forming molecular chains polymerized by itself, as well as providing a portion to be bridged with another molecular chain, may be used. For example, vinyl acrylate, vinyl methacrylate, divinylbenzene, vinyl butyl acrylate may be used as a cross-linked monomer.

At the time of graft polymerization, graft polymerization speed increases with increasing monomer concentration. Further, the higher monomer concentration brings about a tendency to increase graft length and graft density. Accordingly, in order to control the graft length and the graft density, it is preferable to adjust the monomer concentration.

Regarding the temperature for graft polymerizing monomers, because a higher temperature increases polymerization speed of the monomer on one hand but an excessively higher temperature develops a possibility of advancing termination, it is desirable to select an appropriate polymerization temperature for each monomer.

It should be noted that the graft length, in particular, has a tendency to become longer with increasing polymerization time. It is therefore desirable to appropriately adjust the polymerization time for control of the graft length.

Plasma graft polymerization is specifically achieved by the following steps.

(i) The above-described particle is treated by plasma irradiation with 1–1000 W of output at normal frequencies between 10–30 MHz in the presence of a gas having a pressure of $10^{-2}$–10 mbar (1–$10^3$ Pa) for 1–1000 seconds so as to excite the surface of the particle and the internal surface in the pore for radical generation.

(ii) Next, the particle whose surface has been plasma treated is brought into contact with a monomer solution by spraying or immersion. Immersion is more preferable as a contact method. In the immersion method, graft polymerization is achieved by soaking the plasma treated particle in the monomer solution while introducing a gas such as a nitrogen gas, or an argon gas into the monomer solution by bubbling at 20–100 °C. for a duration of between 1 minute and several days.

(iii) Following the graft polymerization, a functional particle in which grafted polymers have been formed is rinsed by toluene, xylene, or the like for approximately 1 hour and then dried.

Because the grafted polymers generated as described above are chemically bonded to particle base material, the grafted polymers do not vary with time.

As the gas to be introduced into the monomer solution, at least one type of gas selected from inert gases, such as a helium gas, an argon gas, and a nitrogen gas, and non-polymerizing gases, such as a carbon dioxide gas, an oxygen gas, a hydrogen gas, and a methane tetrafluoride gas may be utilized. By changing a gas type, wavelength range of vacuum ultraviolet rays can be varied, to thereby enable control of excitation depth in a particle.

Figure 2:
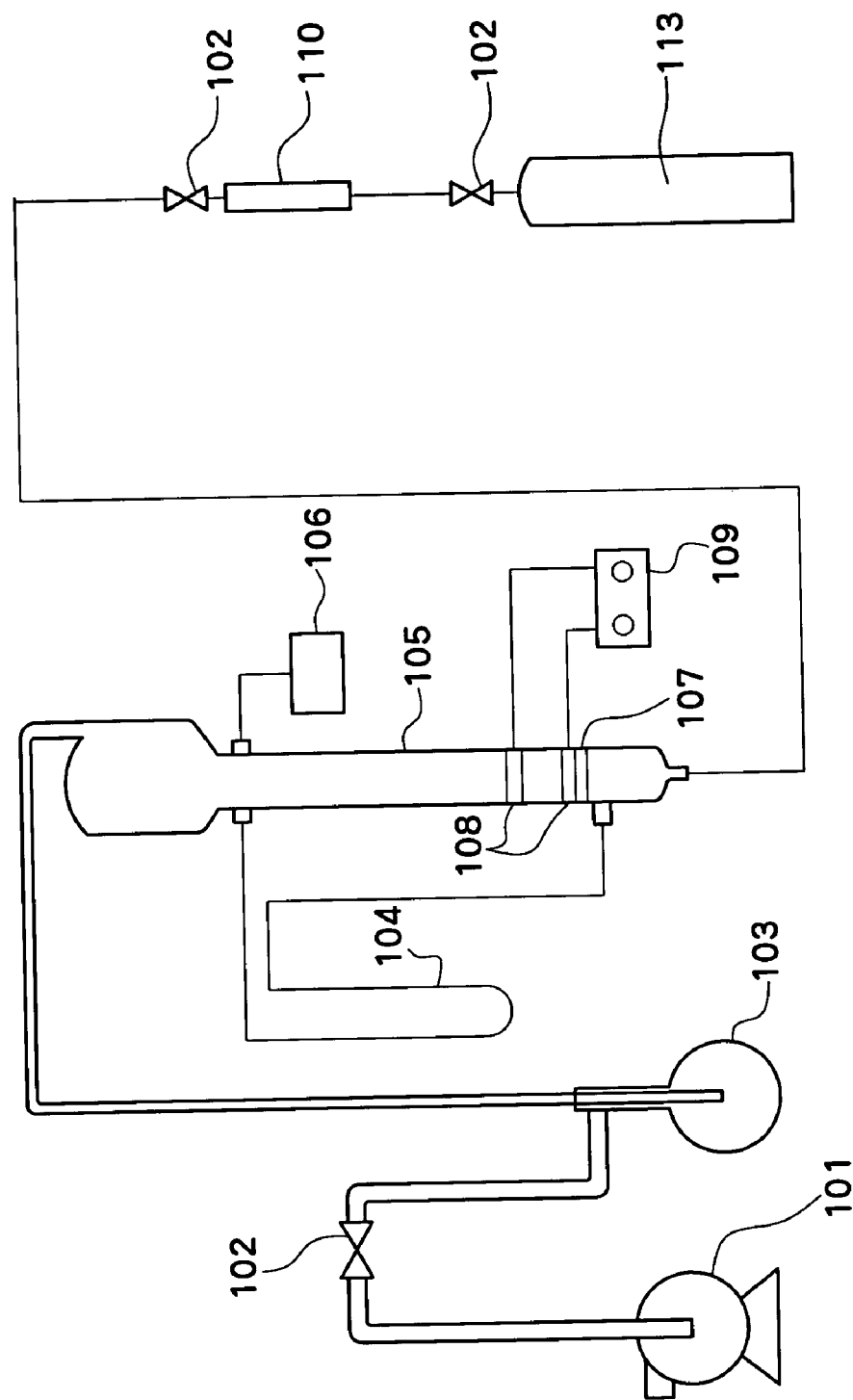
FIG. 2 shows a schematic structure of a plasma graft polymerization apparatus using a fluidization column in the prior art.

FIG. 2 shows an exemplary configuration of a plasma irradiation apparatus used in the above steps. The apparatus shown in FIG. 2 is a conventional fluidization column formation in which electrodes 108 connected to an external high-frequency power source 109 are provided on the lower portion of a low-pressure fluidization column body 105 made of glass where a porous dispersion plate 107 made of glass bead sintered bodies is also provided below the electrodes 108. A manometer 104 for measuring a difference in pressure between upper and lower portions of the low-pressure fluidization column body 105 and a vacuum gauge 106 for detecting the internal degree of vacuum are attached to the low-pressure fluidization column body 105. The low-pressure fluidization column body 105 is connected to a vacuum pump 101 through a flask 103 and decompressed by the vacuum pump 101. On the other hand, a cylinder 113 feeds an inert gas and other gasses via a flow meter 110 into the inside of the low-pressure fluidization column body 105 from the bottom. Accordingly, in a state where the particles are placed on the dispersion plate 107 and the low-pressure fluidization column body 105 is set at a predetermined low pressure in a predetermined inert atmosphere, by turning the high-frequency power source 109 on to irradiate plasma, the particles can be treated by plasma irradiation.

When plasma treated particles are formed in the fluidization column formation shown in FIG. 2, depth of plasma treatment in a particle may be controlled by adjusting plasma irradiation intensity and the degree of vacuum during plasma irradiation.

Embodiment 2

Figure 16:
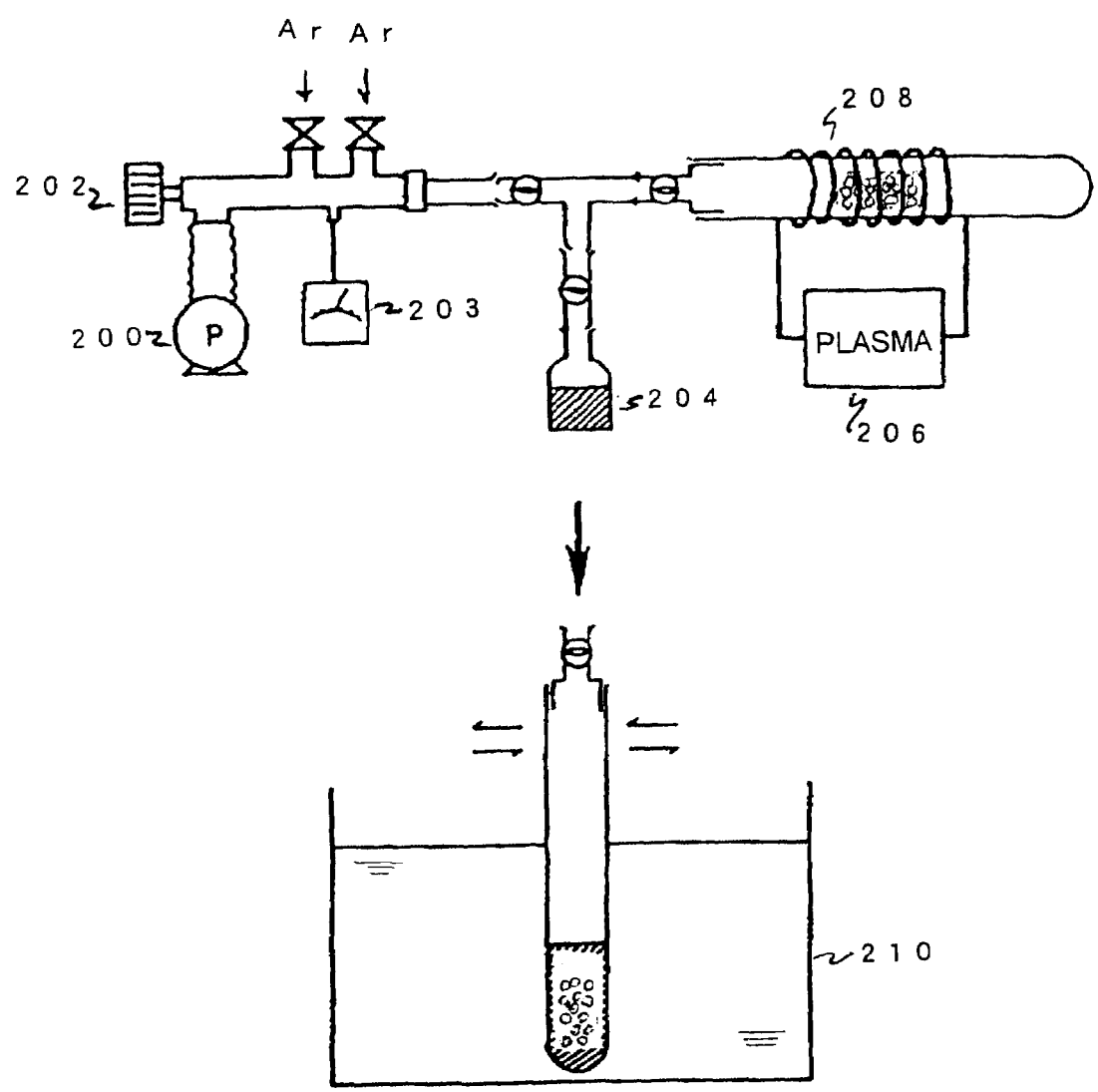
FIG. 16 shows a schematic structure of a plasma graft polymerization apparatus using a fixation chamber of the present invention.

Specific plasma treatment of the present invention is characterized by the fact that, as shown in FIG. 16, particles are fixed in a stacked form and then the fixed particles are subjected to plasma treatment. More specifically, a particle holding container 208 in which a plurality of particles are fixed in a stacked form is connected to a filling valve for introducing an argon gas into the container, a vacuum pump 200, a vacuum valve 202, and a monomer depot 204 via a three-way cock. In the unit-connected apparatus, pressure is evaluated by a reducing gauge 203 to control the degree of vacuum. Further, the particle holding container 208 is connected to a radio-frequency generator 206 by which plasma is irradiated onto the particle holding container 208.

In a fixed plasma treatment apparatus shown in FIG. 16, a valve to establish a connection to the monomer depot 204 is closed, first and then the vacuum valve 202 is closed to set a desired degree of vacuum in the container 208 using the vacuum pump 200 while infusing the argon gas. After reaching the desired degree of vacuum, the radio-frequency generator 206 is turned on for plasma irradiation to carry out plasma treatment at a desired plasma intensity for a predetermined time period. Next, the valve on the side toward the vacuum pump 200 is closed and the valve on the side toward the monomer depot 204 is opened to move the plasma treated particles toward the monomer depot 204. Because the monomer depot 204 is kept in a bath 210 maintained at a predetermined temperature, the monomers can be graft polymerized onto the particles at the predetermined temperature for the predetermined time period.

Figure 3:
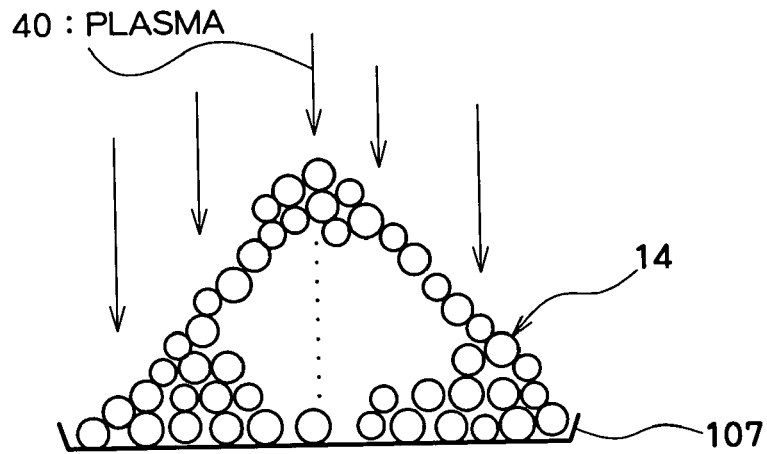
FIG. 3 is a schematic diagram showing plasma irradiation carried out onto stacked particles in the present invention.

In the above-described apparatus, even though the particles are loaded in the container 208 in such a way that the particles are fixed in a stacked form as shown in FIG. 3 and then plasma 40 is irradiated onto the stacked particles, plasma 40 can uniformly excite each surface of the particles including those placed in a deeper region of the stacked form so as to generate radicals.

In the prior art, by moving the particles in the fluidization column, particle surfaces are uniformly treated by plasma irradiation as shown in FIG. 2. On the other hand, according to the present invention, every particle surface can be excited almost uniformly by plasma irradiation even when plasma is irradiated onto the particles fixed in a stacked form. Accordingly, a large amount of particle surfaces can be plasma treated by one-time plasma irradiation, which provides significant improvement in efficiency of plasma irradiation.

Figure 4:
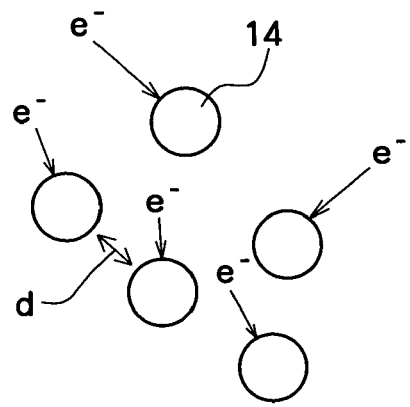
FIG. 4 is a schematic diagram showing irradiation of vacuum ultraviolet rays generated from an excited gas in this invention.

Referring to FIG. 4, a mechanism of the plasma treatment will be described.

In a gap between particles placed in a stacked form, the above-described inert gas and non-polymerizing gas exist. When the inert and other gases are irradiated by plasma, the inert and other gases are excited to become plasma or vacuum ultraviolet rays. Because the excited gases are distributed even to the deepest portion of the stacked particles, the vacuum ultraviolet rays, generated by the excited gases when the excited gases return to a normal state, excite each particle surface so as to generate radicals. The degree of excitation caused by plasma of the inert and other gases varies according to plasma intensity of the gases and the degree of vacuum. The degree of excitation increases with the increase of plasma intensity and increases with the increase of the degree of vacuum.

Figure 5:
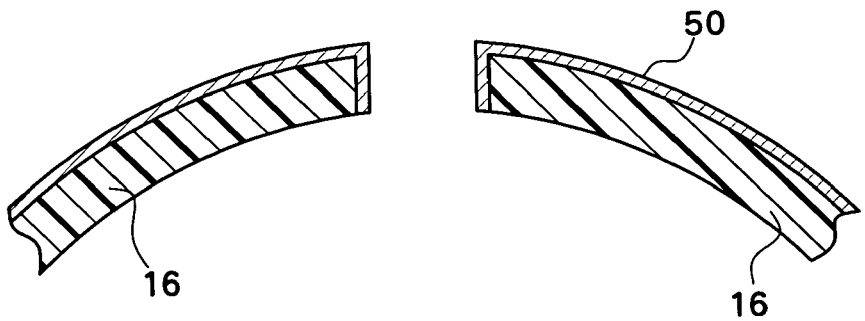
FIG. 5 is a sectional view of a hollow particle for explaining an excited state on the shell surface of the hollow particle caused by irradiation of vacuum ultraviolet rays in this invention.

Generally, the vacuum ultraviolet rays can penetrate into the inside at a depth approximately equal to a membrane thickness of the shell surface of a hollow particle, that is, in the order of nanometers, which enables excitation of a portion ranging from the surface to the depth equal to a certain membrane thickness 50 as shown in FIG. 5.

Figure 6:
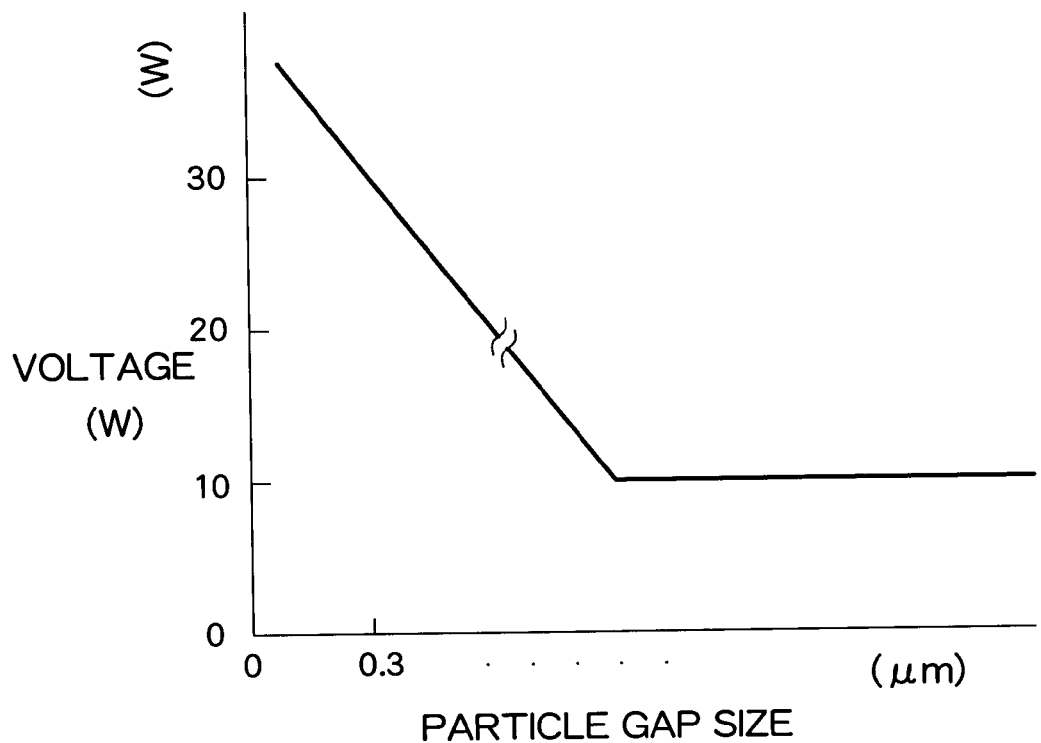
FIG. 6 is an explanatory graph representation showing a relationship between plasma irradiation intensity and the size of a particle gap according to this invention.

Further, as shown in FIG. 6, in a case where plasma irradiation is carried out with a voltage of 30 W at the high-frequency power source, when a particle gap size d is 0.3 µm at a minimum, radicals can be uniformly generated on each surface of the particles including those placed in the deeper region of the stacked form.

Figure 7A:
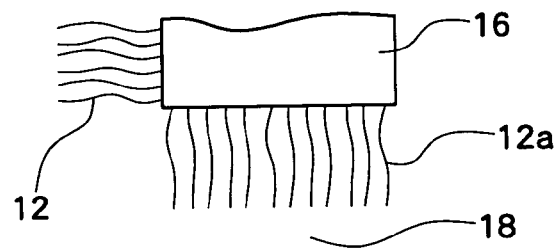
FIGS. 7A and 7B are drawings for explaining a relationship between plasma irradiation intensity and uniformity of graft lengths of grafted polymers.
Figure 7B:
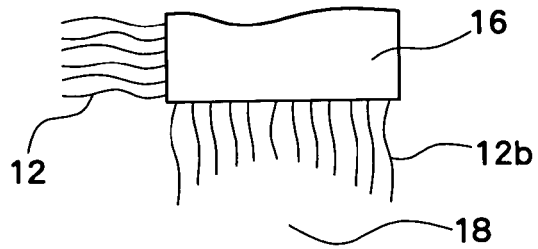

When the particle gap size is 0.3 µm and the voltage is taken as 10 W, graft lengths of grafted polymers formed on the central region of the pore surface locating at a deep portion of the pore become shorter than those formed in the vicinity of the openings as shown in FIG. 7B. On the other hand, when the voltage is taken as 30 W with the particle gap size similar to the above, the graft lengths of grafted polymers formed on the internal surface of the pore become uniform as shown in FIG. 7A. From these facts, it turned out that by carrying out plasma irradiation at such a voltage that the inert and other gases existing in the particle gaps are sufficiently excited, every particle surface can be treated by almost uniform plasma treatment.

It should be noted that the voltage of the high-frequency power source may be reduced with increases of the particle gap size. Plasma is usually irradiated at 10 W. Because an excessively increased voltage results in formation of etched particle surfaces, it is desirable to restrict the voltage to the extent to which the particle surfaces are not etched.

Grafted polymers may be formed on the particle using materials described in the first embodiment by the above-described plasma treatment method. Because, in this approach, a larger amount of particles can be easily plasma treated compared to prior-art methods, functional particles being uniform plasma-graft-polymerized particles can be obtained at low cost.

Embodiment 3

Next, regarding a functional particle consisting of a hollow particle, its features will be described below.

Figure 8:
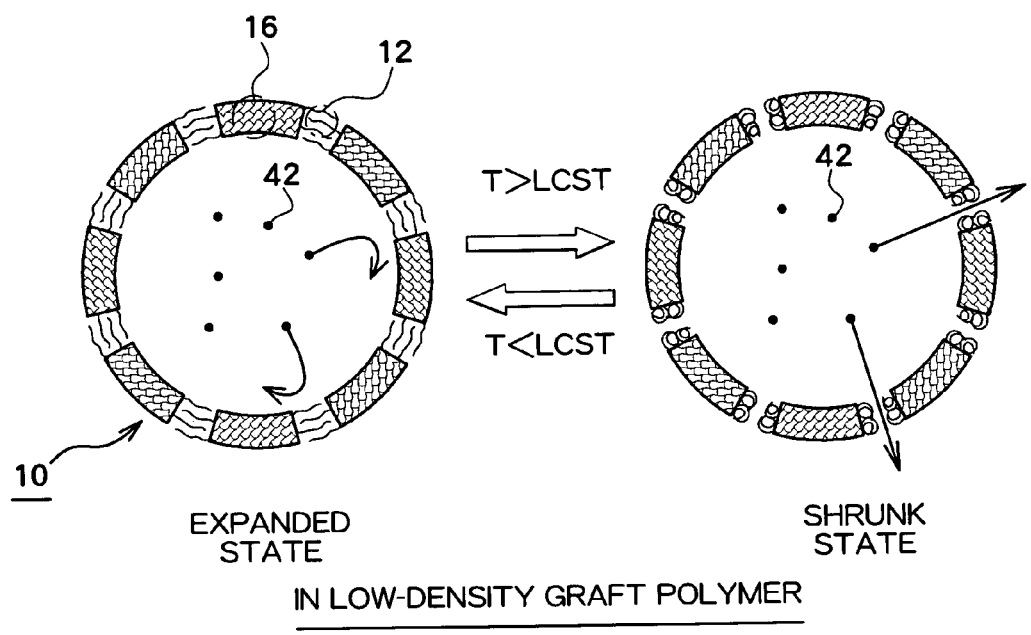
FIG. 8 is an explanatory drawing showing a relationship between temperature and releasing/holding state of inclusions in a microcapsule functional particle having pores which are substantially filled with low-density graft polymers in this invention.

In step (ii) of the plasma graft polymerization, a decreased graft time leads to growth of a particle having a pore which is filled with low-density graft polymers (i.e. a pore filled with grafted polymers formed at a low density). A particle of such a low-density graft polymer has a feature as shown in FIG. 8. More specifically, when a temperature T around the particle is lower than the above-described LCST, the grafted polymers expand and thereby block the pore. As a result, inclusions 42 in a functional particle 10 are retained in the inside of the functional particle 10 rather than released to the outside. On the other hand, when the temperature T around the particle is higher than the LCST, the grafted polymers shrink so that the inclusions 42 of the functional particle 10 are released from the pores.

In particular, by using a straight-chain monomer, such as, for example, an acrylic series and a methacrylic series, as a raw-material monomer for a grafted polymer, response speed relative to temperature becomes shorter compared with a case using another monomer, such as a branch-type monomer and a monomer having a large steric hindrance.

Figure 9:
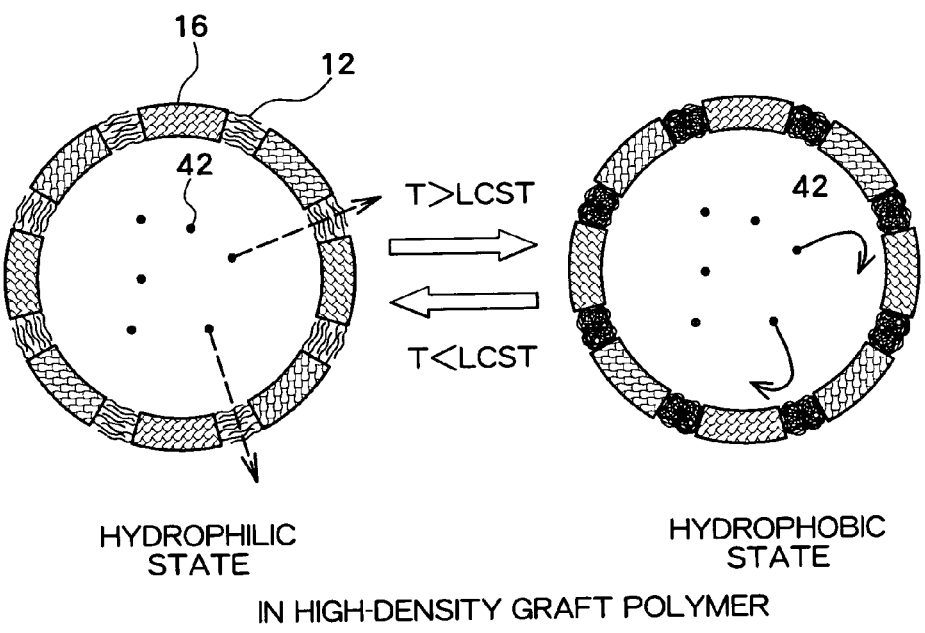
FIG. 9 is an explanatory drawing showing a relationship between temperature and releasing/holding state of inclusions in a microcapsule functional particle having pores which are substantially filled with high-density graft polymers in this invention.

In step (ii) of the plasma graft polymerization, on the other hand, an increased graft time leads to growth of a particle having a pore which is filled with high-density graft polymers (i.e. a pore filled with grafted polymers formed at a high density). A particle of such a high-density graft polymer has a feature as shown in FIG. 9. More specifically, when the temperature T around the particle is higher than the LCST, the grafted polymers hitch to each other in a wedge-wise manner and thereby block the pore. Accordingly, the inclusions 42 of the functional particle 10 are retained in the inside rather than released to the outside. On the contrary, when the temperature T around the particle is lower than the LCST, not so many grafted polymers hitch with each other. Therefore, the inclusions 42 of the functional particle 10 are prone to be released from the pores.

A method for preparing a hollow functional particle as described above comprises steps of (i) adjusting a solution having an inclusion to be inserted into a particle so as to have a first temperature, at which grafted polymers which substantially fill the pore of the functional particle are shrunk or become hydrophilic (the first temperature being higher than the LCST for making low-density graft polymers shrink, or being lower than the LCST for making high-density graft polymers be hydrophilic), or a first pH, (ii) soaking the functional particle in the solution having an inclusion adjusted at the first temperature or the first pH, and then adjusting the solution having an inclusion so as to have a second temperature, at which the grafted polymers in the functional particle are expanded or become hydrophilic (the second temperature being lower than the LCST for making the low-density graft polymers shrink, or being higher than the LCST for making the high-density graft polymers be hydrophilic), or a second pH, and (iii) separating an inclusion-impregnated functional particle from the solution having an inclusion.

Regarding the above-described grafted polymer, changes in density of grafted polymers relative to graft time, and the behavior thereof will be described below.

EXAMPLE

<Method For Preparing Microcapsule>

A polyamide microcapsule of core-shell type is prepared by interfacial polymerization using ethylenediamine (manufactured by TOKYO KASEI KOGYO CO., LTD.) and terephthaloyl dichloride (manufactured by Wako Pure Chemical Industries, Ltd.). Specifically, 160 ml of water phase containing 1.0 wt % of sodium dodecyl sulfate (SDS) (manufactured by TOKYO KASEI KOGYO CO., LTD.) is added, as an emulsifier, to 10 ml of organic phase containing 0.5 M of terephthaloyl dichloride. As organic phase, a solvent in which the ratio of chloroform to cyclohexane is 3:1 is used.

The organic phase and the water phase are agitated at an agitation speed of 800 rpm for 10 minutes to obtain an O/W emulsion. Then, the agitation speed is lowered to 200 rpm. At this agitation speed, a buffer solution of 20 ml of water solution containing 1.18 M of sodium carbonate and 15 ml of ethylenediamine monomers are added to the obtained O/W emulsion, which is further agitated for a while. During the emulsification and the interfacial polymerization, temperature is always maintained at 10° C. using a thermostat unit (COOLNIT CL-80F, manufactured by TAITEC). The generated microcapsule is separated by centrifugal separation, then rinsed with deionized water three times, and then freeze dried after removing the emulsion and remaining monomers, to thereby eliminate organic solvents and others from the microcapsule.

<Method For Preparing a Functional Particle Having a Pore Filled With Grafted Polymers of Poly (N-isopropyl Acrylamide) (Hereinafter Referred to as "PNIPAM")>

The freeze dried microcapsule is inserted in the low-pressure fluidization column body of the above-described apparatus. The low-pressure fluidization column body is filled with an argon gas and then decompressed to 10 Pa. After decompression, high-frequency plasma of 13.56 MHz is irradiated onto the microcapsule at 30 W for 60 seconds. Next, the microcapsule is soaked in an air-insulated N-isopropyl acrylamide (NIPAM) monomer solution for graft polymerization for a desired time period while maintaining the temperature at 30° C.

The functional particle of the microcapsule in which PNIPAM is grafted is separated by centrifugation and then rinsed with deionized water three times.

According to observation of a cross section of the obtained functional particle using a scanning electron microscope (FE-SEM S-900S, manufactured by Hitachi, LTD.), graft polymerization occurs not only on the particle surface but also in the pores and the pores are filled with PNIPAM graft polymers.

<Functional Particle of Microcapsule Having Temperature Respondent Property>

A temperature response property by plasma graft polymerization requirement[BS1] of the functional particle of the microcapsule prepared using the above method will be described below.

It should be noted that in FIGS. 10–15, "MC6281g05W20", for example, represents a functional particle obtained by irradiating functional particle "MC6281g", prepared by the above-described method for preparing a microcapsule, with high-frequency plasma with an output of "5" W for "20", that is, 20 minutes for graft polymerization, and the same for others.

Figure 10:
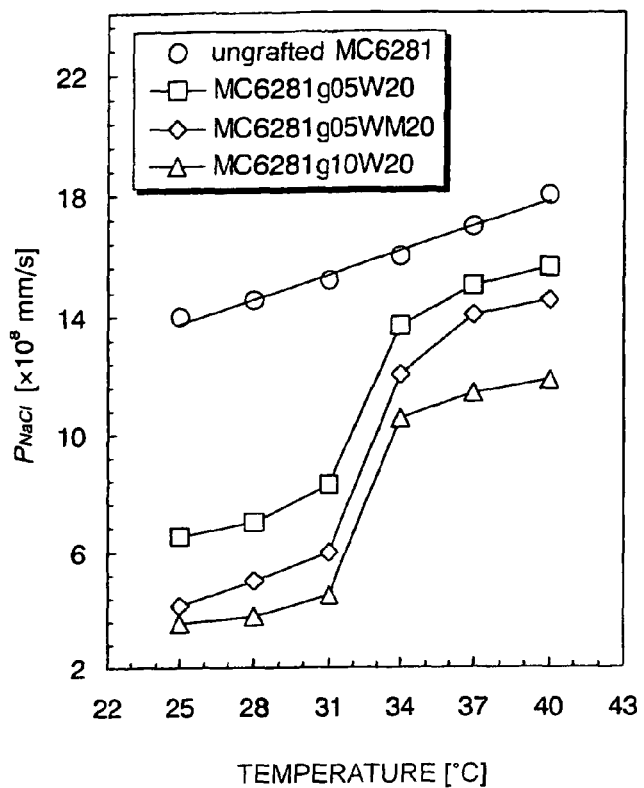
FIG. 10 is a graph representation showing a relationship between temperature and releasing/holding state of inclusions in microcapsule functional particles containing low-density graft polymers and the relationship in a microcapsule which is not graft polymerized.
Figure 11:
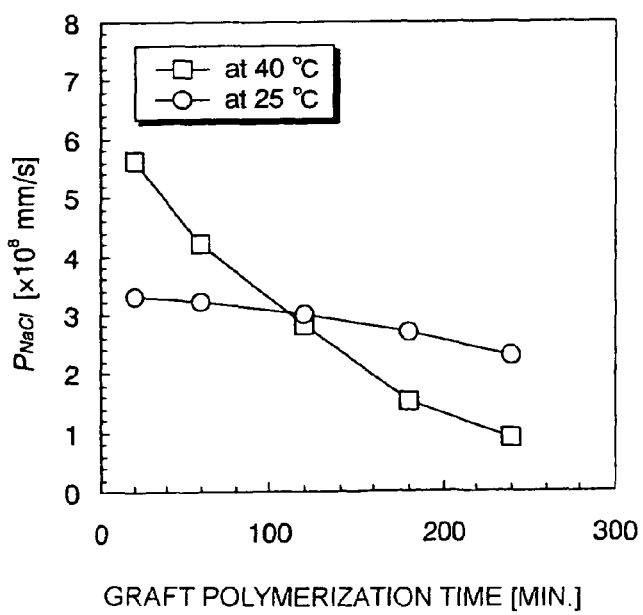
FIG. 11 is a graph representation for explaining the extent to which inclusions are released in response to graft time at a particular temperature.
Figure 12:
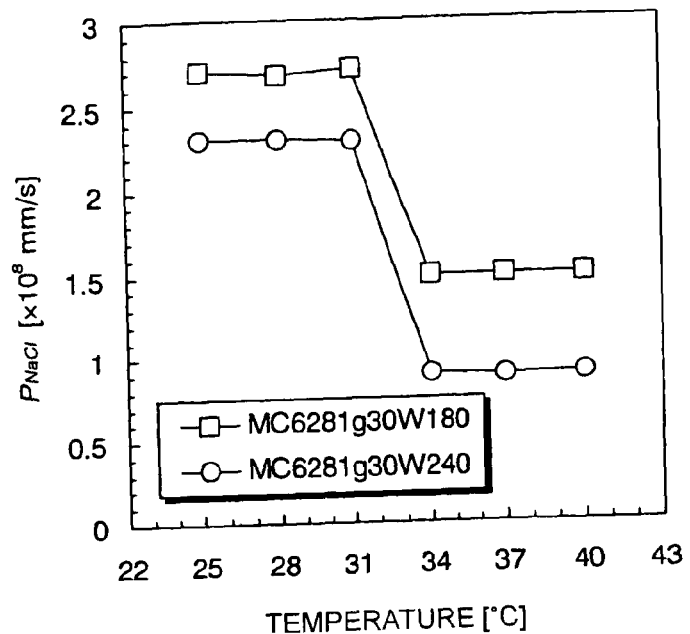
FIG. 12 is a graph representation showing a relationship between temperature and releasing/holding state of inclusions in microcapsule functional particles containing high-density graft polymers and the relationship in a microcapsule which is not graft polymerized.

FIGS. 10 to 12 show changes in degree of releasing of sodium chloride relative to the temperature around a functional particle of the microcapsule containing a saline solution therein.

As can be seen from FIG. 10, it is found that the functional particle having low-density graft polymers graft polymerized for 20 minutes in a pore displays remarkable change in degree of releasing sodium chloride at temperatures of 31–34° C., compared with a microcapsule which is not graft polymerized. Further, regarding the functional particle, it can also be seen that the degree of releasing sodium chloride at temperatures of 34–41° C. is higher than that at temperatures of 25–31° C.

As shown in FIG. 12, it is found that the functional particles prepared with the graft polymerization times of 180 minutes and 240 minutes have high-density graft polymers filling their pores. The functional particles having the high-density graft polymers display significant changes in the degree of releasing of sodium chloride at temperatures of 31–34° C., and the degree of releasing of the functional particles at temperatures of 25–31° C. is higher than that at temperatures of 34–41° C.

The above functional particles have the LCST, which is at 31–34° C., and the above-described temperature respondent property.

More specifically, as shown in FIG. 11, shorter graft time results in a shorter graft length, and as a result low-density graft polymers having a feature such that the degree of releasing of sodium chloride contained therein is higher at higher temperatures than at lower temperatures are obtained, whereas longer graft time results in a longer graft length, as a result of which high-density graft polymers having a feature such that the degree of releasing of sodium chloride contained therein is higher at lower temperatures than at higher temperatures are obtained. Accordingly, it can be said that such a particular temperature response property is imparted to the above functional particle.

Figure 13:
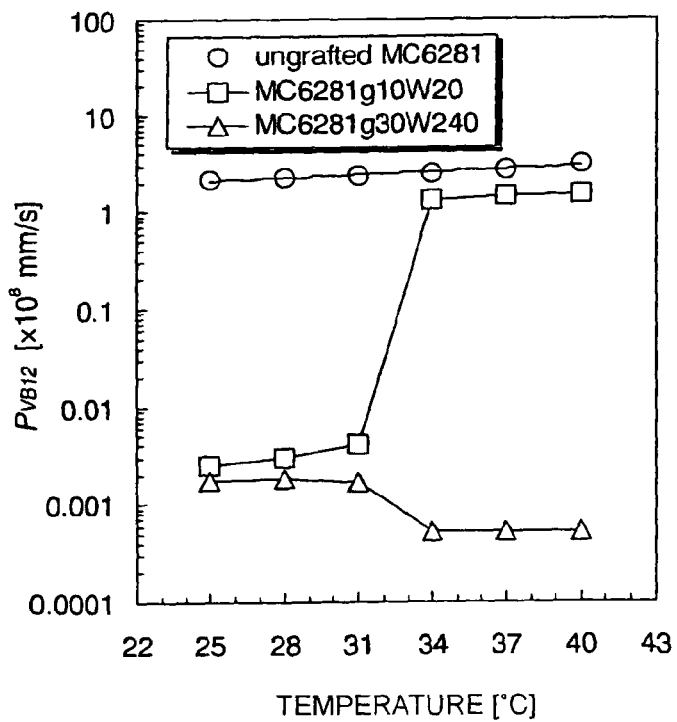
FIG. 13 is a graph representation showing a relationship between temperature and releasing/holding state of inclusions (vitamin $B_{12}$) in microcapsule functional particles containing high-density and low-density graft polymers and in a microcapsule which is not graft polymerized.

Similarly, as shown in FIG. 13, for a case where vitamin $B_{12}$ is included in the functional particle, the same results as those described above are obtained.

Figure 14:
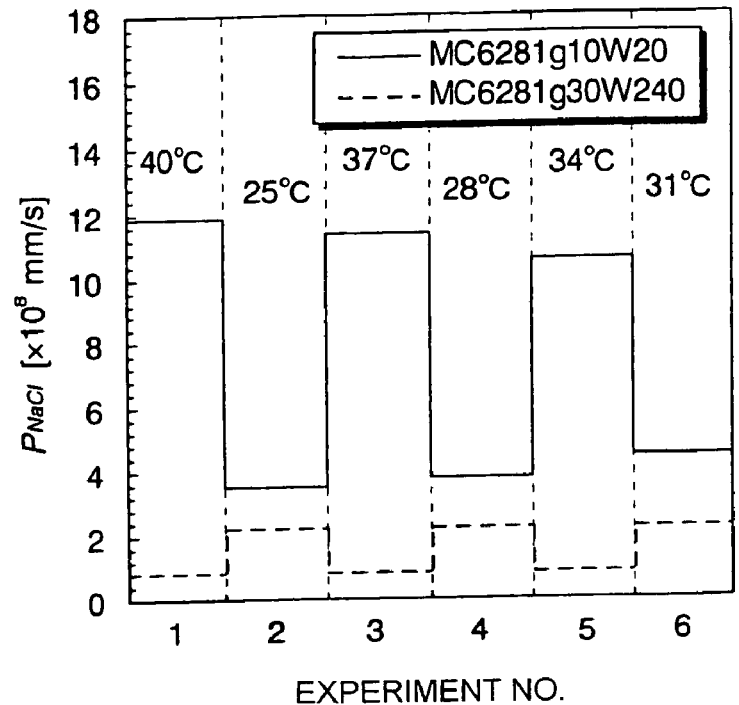
FIG. 14 is an explanatory graph representation showing ON/OFF state for releasing inclusions with reference to temperature in a microcapsule functional particle containing low-density graft polymers and in a microcapsule functional particle containing high-density graft polymers when sodium chloride is used as the inclusions.
Figure 15:
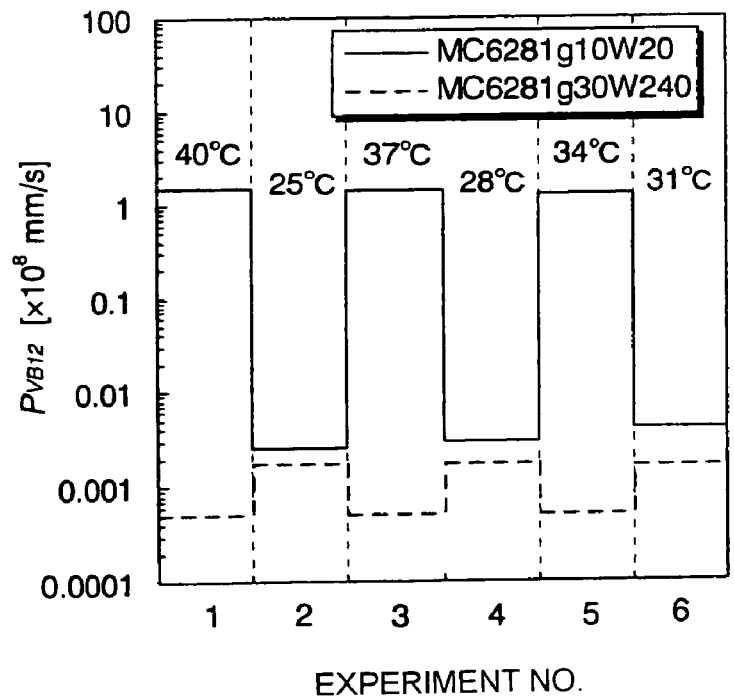
FIG. 15 is an explanatory graph representation showing ON/OFF state for releasing inclusions with reference to temperature in a microcapsule functional particle containing low-density graft polymers and in a microcapsule functional particle containing high-density graft polymers when vitamin $B_{12}$ is used as the inclusions.

Further, as shown in FIGS. 14 and 15, the characteristics of retaining and releasing sodium chloride and vitamin $B_{12}$, included in the microcapsule, according to temperature, are reversed with respect to the other retaining or releasing characteristic depending on the graft polymerization time of each graft polymer. As can also be seen from the figures, variations in released quantity from the functional particle of the low-density graft polymer are larger than variations in released quantity from the functional particle of the high-density graft polymer. Further, it is found that the released quality from the functional particle can be controlled by the temperature of the functional particle.

As described above, according to the functional particle and a functional particle preparing method of the present invention, by appropriately adjusting at least one of the requirement for plasma intensity, the degree of vacuum, monomer concentration, monomer polymerization temperature, and polymerization time, a desired functional particle can be obtained. The obtained functional particle which is graft polymerized can shift its state between retaining and releasing of inclusions in response to temperature around the functional particle, and can be controlled so as to change the release quantity.

Further, even in a case where a plurality of particles are fixed in a stacked form and subjected to plasma polymerization in the stacked form, by changing plasma intensity and/or the degree of vacuum according to the particle gap size, the whole particle can be uniformly plasma treated.

The functional particle according to the present invention may be used in a drug delivery system (DDS), used as a time-release microcapsule (for example, a microcapsule for soil improvement or for the distribution of agricultural chemicals in addition to a microcapsule for the DDS), and used for a temperature sensor and a pH sensor.

What is claimed is:

1. A functional particle preparing method comprising steps of:
    treating either one of a hollow particle or a porous particle having a pore on the surface thereof by plasma irradiation under a pressure of $10^{-2}$–10 mbar (1–$10^3$ Pa),
    graft polymerizing at least one type of monomer onto the surface of the plasma irradiated particle by contacting the at least one type of monomer with the surface of the plasma irradiated particle so as to substantially fill the pore of said particle with grafted polymers of said monomer;
    soaking said graft polymerized particle in a solution having an inclusion to be inserted into said graft polymerized particle, where the solution having the inclusion is adjusted such that the grafted polymers shrink to form openings that allow said inclusion to pass into said pore or through said pore into a cavity region within said particle;
    adjusting the solution having the inclusion such that the grafted polymers expand to close said openings and to prevent said inclusion from passing through said pore such that a functional particle having inclusion impregnated therein is obtained; and
    separating said functional particle from said solution; wherein
    during said plasma irradiation, plasma intensity and/or degree of vacuum are controlled; and
    during said contacting the at least one type of monomer with the surface of the plasma irradiated particle, at least one of the requirements for monomer concentration, graft polymerization temperature, and graft polymerization time is adjusted to control graft polymerization yield of said grafted polymers.

2. A functional particle preparing method according to claim 1, wherein contacting the at least one type of monomer with the surface of the plasma irradiated particle comprises soaking said plasma irradiated particle in a monomer solution or contacting said plasma irradiated particle with a monomer gas.

3. A functional particle preparing method according to claim 1, wherein said graft polymerizing further comprises contacting said plasma irradiated particle with a cross-linking agent simultaneously with or subsequently to said contacting the at least one type of monomer with the surface of the plasma irradiated particle.

4. A functional particle preparing method according to claim 1, wherein said particle consists of at least one of an organic macromolecule and an inorganic macromolecule.

5. A functional particle prepared by the functional particle preparing method according to claim 1.

6. A functional particle according to claim 5, wherein said grafted polymers shrink to form openings that allow said inclusion to pass into said pore or through said pore into said cavity region within said particle at temperatures lower than a lower critical solution temperature and said graft polymers expand to close said openings and to prevent said inclusion from passing through said pore at temperatures higher than the lower critical solution temperature.

7. A functional particle according to claim 5, wherein said grafted polymers shrink to form openings that allow said inclusion to pass into said pore or through said pore into said cavity region within said particle at temperatures higher than a lower critical solution temperature and said graft polymers expand to close said openings and to prevent said inclusion from passing through said pore at temperatures lower than the lower critical solution temperature.

8. A functional particle prepared by the functional particle preparing method according to claim 1, wherein said grafted polymers of said functional particle shrink to form openings that allow said inclusion to pass into said pore or through said pore into said cavity region within said particle at temperatures lower than a lower critical solution temperature and said graft polymers expand to close said openings and to prevent said inclusion from passing through said pore at temperatures higher than the lower critical solution temperature.

9. A functional particle according to claim 8, wherein the functional particle is a time-release particle in which said inclusion is released in response to variations in temperature around said functional particle.

10. A functional particle prepared by the functional particle preparing method according to claim 1, wherein said grafted polymers of said functional particle shrink to form openings that allow said inclusion to pass into said pore or through said pore into said cavity region within said particle at temperatures higher than a lower critical solution temperature and said graft polymers expand to close said openings and to prevent said inclusion from passing through said pore at temperatures lower than the lower critical solution temperature.

11. A functional particle according to claim 10, wherein the functional particle is a time-release particle in which said inclusion is released in response to variations in temperature around said functional particle.

12. A functional particle obtained by a process comprising:
    treating either one of a hollow particle or a porous particle having a pore on the surface thereof by plasma irradiation,
    graft polymerizing at least one type of monomer onto the surface of the plasma irradiated particle by contacting the at least one type of monomer with the surface of the plasma irradiated particle so as to substantially fill the pore of said particle with grafted polymers of said monomer; and
    impregnating said pore and/or a cavity region of said particle with an inclusion; wherein
    during said plasma irradiation, a pressure of $10^{-2}$–10 mbar (1–$10^3$ Pa), plasma intensity and/or degree of vacuum are controlled, and
    during said contacting the at least one type of monomer with the surface of the plasma irradiated particle, at least one of the requirements for monomer concentration, graft polymerization temperature, and graft polymerization time is adjusted to control graft polymerization yield of said grafted polymers, and
    impregnating said pore and/or a cavity region of said particle comprises:
        soaking said graft polymerized particle in a solution having an inclusion to be inserted into said graft polymerized particle, where the solution having the inclusion is adjusted such that the grafted polymers shrink to form openings that allow said inclusion to pass into said pore or through said pore into a cavity region within said particle; and adjusting the solution having the inclusion such that the grafted polymers expand to close said openings and to prevent said inclusion from passing through said pore such that a functional particle having inclusion impregnated therein is obtained.

13. A functional particle according to claim 12, wherein contacting the at least one type of monomer with the surface of the plasma irradiated particle comprises soaking said plasma irradiated particle in a monomer solution or contacting said plasma irradiated particle with a monomer gas.

* * * * *